(12) United States Patent
Lal et al.

(10) Patent No.: US 6,210,819 B1
(45) Date of Patent: Apr. 3, 2001

(54) MAGNETIC RECORDING MEDIA HAVING A CRTI UNDERLAYER DEPOSITED UNDER A SUBSTRATE BIAS

(75) Inventors: Brij Bihari Lal, Milpitas; Lan Zhang, Fremont, both of CA (US)

(73) Assignee: HMT Technology Corporation, Fremont, CA (US)

( * ) Notice: Subject to any disclaimer, the term of this patent is extended or adjusted under 35 U.S.C. 154(b) by 0 days.

(21) Appl. No.: 09/122,303

(22) Filed: Jul. 24, 1998

(51) Int. Cl.$^7$ .................................................. G11B 5/66
(52) U.S. Cl. ................ 428/694 T; 428/694 TS; 428/900; 204/192.2
(58) Field of Search .......... 428/634 T, 634 TS, 428/900; 204/192.2

(56) References Cited

U.S. PATENT DOCUMENTS

| | | | |
|---|---|---|---|
| 4,632,883 | 12/1986 | Howard et al. | 428/611 |
| 4,743,491 | 5/1988 | Asada et al. | 428/213 |
| 4,997,539 | 3/1991 | Komizo et al. | 204/192.2 |
| 5,069,983 | 12/1991 | Nakamura et al. | 428/611 |
| 5,147,734 | 9/1992 | Nakamura et al. | 428/694 T |
| 5,456,978 | 10/1995 | Lal et al. | 428/332 |
| 5,492,745 | 2/1996 | Yokoyama | 428/65.3 |
| 5,714,044 | 2/1998 | Lal et al. | 204/192.16 |
| 5,744,253 | 4/1998 | Lal et al. | 428/611 |
| 5,922,456 | * 7/1999 | Tonohashu | 428/332 |

OTHER PUBLICATIONS

Lal, Brij B. and Michael Russak, "Effects of Cr and magnetic bias on read/write and noise characteristics of CoCrTa/Cr longitudinal thin–film media," J. Appl. Phys. 81(8) :3934–3936 (1997).

Matsuda, Y., et al., "Reduction of Co–Cr–Pt media noise by addition of Ti to Cr underlayer," J. Appl. Phys. 79(8) :5351–5353 (1996).

* cited by examiner

*Primary Examiner*—Leszek Kiliman
(74) *Attorney, Agent, or Firm*—Judy M. Mohr; Iota Pi Law Group

(57) ABSTRACT

A longitudinal magnetic recording medium having a CrTi underlayer deposited under a substrate bias is described. The medium has improved magnetic recording properties.

15 Claims, 6 Drawing Sheets

MAGNETIC RECORDING MEDIA HAVING A CRTI UNDERLAYER DEPOSITED UNDER A SUBSTRATE BIAS

FIELD OF THE INVENTION

The present invention relates to a longitudinal magnetic recording medium for use in a computer disk drive.

BACKGROUND OF THE INVENTION

Thin-film magnetic recording media formed on a rigid disc substrate are widely used in read/write memory devices in computers. The demand for data storage capacity in such devices has increased dramatically in recent years and disc drives using inductive head technology have a storage capacity, i.e., areal density, on the order of 400 Mb/in$^2$, and those using magnetoresistive heads are over 600 Mb/in$^2$ (Russak, M. R., et al., *Proc. Electrochem. Soc.*, 95(18):143–156 (1996)).

The storage capacity of magnetic media can be improved in several ways, including increasing media coercivity, reducing the magnetic remanence-thickness product, reducing media noise and decreasing the flying height.

A high coercivity is one factor important in achieving a high recording density in a magnetic disc. Coercivity, defined as the magnetic flux required to reduce the remanence magnetic flux to zero, i.e., the field required to erase a stored bit of information. A higher coercivity in a medium allows adjacent recorded bits to be placed more closely together without mutual cancellation. Thus, higher coercivity is associated with higher information storage density.

Magnetic remanence, $M_r$, provides a measure of the signal amplitude which can be read from an isolated pulse stored in a magnetic medium. The greater the remanence, or moment, the greater the signal amplitude which can be detected in a reading operation.

Signal-to-noise ratio (SNR) is the ratio of signal amplitude, or peak-to-peak amplitude of a single pulse, as a function of recording frequency, to recording noise at that frequency. A high SNR, due to sinal amplitude and/or low noise, is necessary for high density recording.

Widely used commercial thin-film media are prepared by sputtering a magnetic thin film on a substrate, such as a textured, plated aluminum substrate. The disc is typically prepared by sputtering a chromium underlayer onto the substrate surface, then sputtering the magnetic thin film recording layer over the underlayer.

One approach to improving disc storage density by increasing the coercivity has been to vary the composition and method of preparing the underlayer. For example, an increase in the thickness of the chromium underlayer results in an increased coercivity. (Fisher, R. D. et al., *IEEE Trans. on Magn.*, 22:352 (1986); Johnson, K. E., *J. Appl. Phys*, 67:4686 (1990)).

Another approach to improving coercivity, and hence storage capacity, is to employ certain magnetic alloys which result in improved coercivity, for example, by including platinum in a CoCr-based magnetic recording film.

Another approach to increasing media coercivity is to apply a negative voltage bias to the substrate during sputtering. Typically, an improvement in coercivity is observed when the bias is applied to the substrate during sputtering of the magnetic recording layer, with no improvement, or a reduction in coercivity, achieved with the bias is applied during sputtering of the chromium underlayer (Lal, B. B. and Russak, M. A., *J. Appl. Phys.*, 81(8):3934 (1997)). A voltage bias during sputtering of both the chromium-based underlayer and the magnetic layer can also improve coercivity (Lal, B. B. and Russak, M. A., *J. Appl. Phys.*, 81(8):3934 (1997); U.S. Pat. No. 5,069,983). Others have reported modest increases in coercivity when a bias is applied to the substrate during sputtering of the chromium underlayer (U.S. Pat. No. 5,147,734).

SUMMARY OF THE INVENTION

Accordingly, it is an object of the invention to provide a magnetic recording medium having an improved coercivity for improved storage capacity.

In one aspect, the invention includes a magnetic recording medium for longitudinal recording, comprising an underlayer film composed of 5–50 atomic percent titanium, balance chromium, deposited on a rigid disc substrate by sputtering in the presence of a negative voltage bias. Sputter deposited directly on the underlayer film is a magnetic recording film composed of an alloy including cobalt and chromium.

In one embodiment, the underlayer film is composed of 15–25 atomic percent titanium, balance chromium. In a preferred embodiment the underlayer is a chromium-titanium alloy composed of 80 atomic percent chromium and 20 atomic percent titanium.

The negative voltage bias applied to the substrate during deposition of the underlayer, in one embodiment, is between 50–750 volts. In another embodiment, the voltage bias is between 50–500 volts.

In another aspect, the invention includes a method of preparing a magnetic recording medium for longitudinal recording. The method includes depositing under a negative voltage bias an underlayer film composed of 5–50 atomic percent titanium, balance chromium, the underlayer being deposited on a rigid disc substrate. Deposited directly on the underlayer film is a magnetic recording film composed of an alloy including cobalt and chromium.

In one embodiment of the method, the underlayer film is composed of 15–25 atomic percent titanium, balance chromium. In a preferred embodiment of the method, the underlayer is a chromium-titanium alloy composed of 80 atomic percent chromium and 20 atomic percent titanium.

The negative voltage bias applied to the substrate during sputtering of the chromium-titanium underlayer is between typically between −50 to −750 volts, more preferably between −50 to −500 volts.

In another aspect, the invention includes an improvement in a method of preparing a longitudinal magnetic recording medium having an underlayer composed of an alloy of chromium and titanium and magnetic recording layer composed of a cobalt-chromium alloy. The improvement is effective to increase the magnetic remanence thickness product by at least about 10%, and includes sputter depositing the underlayer under a negative voltage bias.

These and other objects and features of the invention will be more fully appreciated when the following detailed description of the invention is read in conjunction with the accompanying drawings.

DETAILED DESCRIPTION OF THE INVENTION

I. Thin-Film Medium

Figure 1:
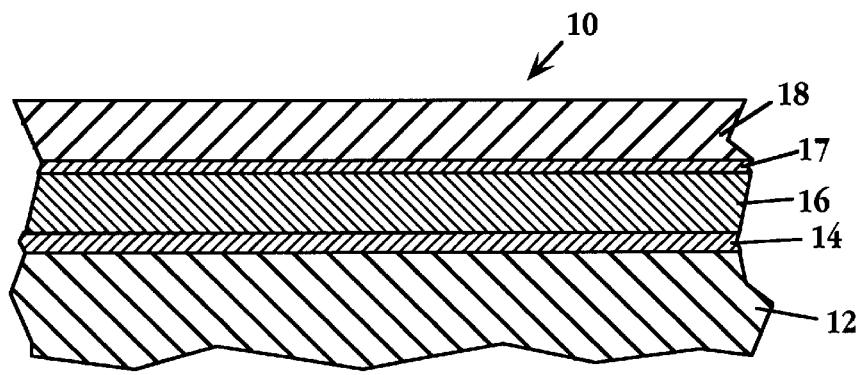
FIG. 1 is a cross-sectional view of a magnetic recording medium formed in accordance with the invention.

FIG. 1 shows in cross section view, a fragmentary portion of a thin-film medium or disc 10 formed in accordance with the invention. The disc generally includes a rigid substrate 12, and forming successive thin-film layers over the substrate, a crystalline underlayer 14, a magnetic thin-film layer 16, and a protective carbon overcoat 20. It will be appreciated that the disc is symmetrical with respect to its upper and lower surfaces, the lower portion of the disc not being shown in the figure.

The substrate can be either a metallic or non-metallic substrate, such as a conventional surface-coated, aluminum substrate of the type used commonly for digital recording medium. Suitable non-metallic materials for the substrate include glass, ceramic, glass-ceramic, carbon, silicon nitride, silicon carbide or a heat-resistant polymer. Conventional substrates are typically 130 mm or 95 mm in outer diameter (5.1 inches and 3.74 inches respectively), with corresponding inner diameters of 40 mm and 25 mm (1.57 inches and 0.98 inches), respectively.

The substrate is generally textured by any of the methods known in the art to achieve suitable friction during contact-start-stop with the recording head, yet is sufficiently smooth for acceptable flying head height.

According to an important feature of the invention, underlayer 14 is composed of an alloy of chromium (Cr) and titanium (Ti), where the amount of titanium is between 5–50 atomic percent and the balance chromium, e.g., between 50–95 atomic percent chromium. In a preferred embodiment, the alloy includes between 10–30 atomic percent, balance chromium (70–90 atomic percent chromium), and in a more preferred embodiment, the alloy includes between 15–25 atomic percent titanium with the balance (75–85 atomic percent) chromium.

The CrTi underlayer is deposited to a desired thickness of typically between 200–3,000 Å by techniques known in the art, such as varying the sputtering time and/or rate.

As will be described below, and in accordance with another important feature of the invention, the CrTi underlayer is sputter deposited on the substrate in the presence of a negative voltage bias. In studies performed in support of the invention, a CrTi alloy of 80 atomic percent chromium and 20 atomic percent titanium was deposited on the substrate in the presence of a voltage bias of −250 V and −500 V. Surprisingly, substantial improvements in magnetic recording properties, including improved coercivity and magnetic remanence thickness product, were achieved.

With continuing reference to FIG. 1, magnetic layer 16 is preferably a cobalt-based alloy which is formed on the underlayer by sputtering or the like to a desired thickness, preferably between 100–800 Å. A "cobalt-based" alloy refers to an alloy containing at least 50 atomic percent cobalt. Exemplary binary cobalt-based alloys include Co/Cr or Co/Ni, and exemplary ternary, quaternary, and five-element alloys include Co/Cr/Ta, Co/Ni/Pt, Co/Ni/Cr, Co/Cr/Ta/Pt, Co/Ni/Cr/Pt, and Co/Cr/Ni/Pt/B. A preferred cobalt-based alloy is composed of 80–90% cobalt, 5–20% chromium and 2–10% tantalum. Another preferred cobalt-based alloy is composed of 70–90% cobalt, 5–20% chromium, 2–10% tantalum and 1–8% platinum.

In the studies described below and performed in support of the invention, the magnetic recording layer is composed of 74% cobalt, 17% chromium, 4% tantalum and 5% platinum. The magnetic layer can be deposited in the absence of a substrate bias or in the presence of a substrate bias. In the studies reported below, a −250 volt substrate bias was applied during deposition of the magnetic layer.

The thin-film magnetic layer may also be a multilayer structure composed of two or more magnetic thin-film sublayers, each separated by a thin isolation layer, such as a 2–50 Å chromium isolation layer.

Overcoat 18 is formed by sputter deposition onto the magnetic recording layer. The overcoat may be composed of carbon, silicon oxide, silicon nitride, or other suitable material giving wear-resistant, protective properties to the medium. Preferably, the overcoat is formed of carbon and has a thickness between 80–250 Å.

II. Method of Preparing the Medium

Figure 2:
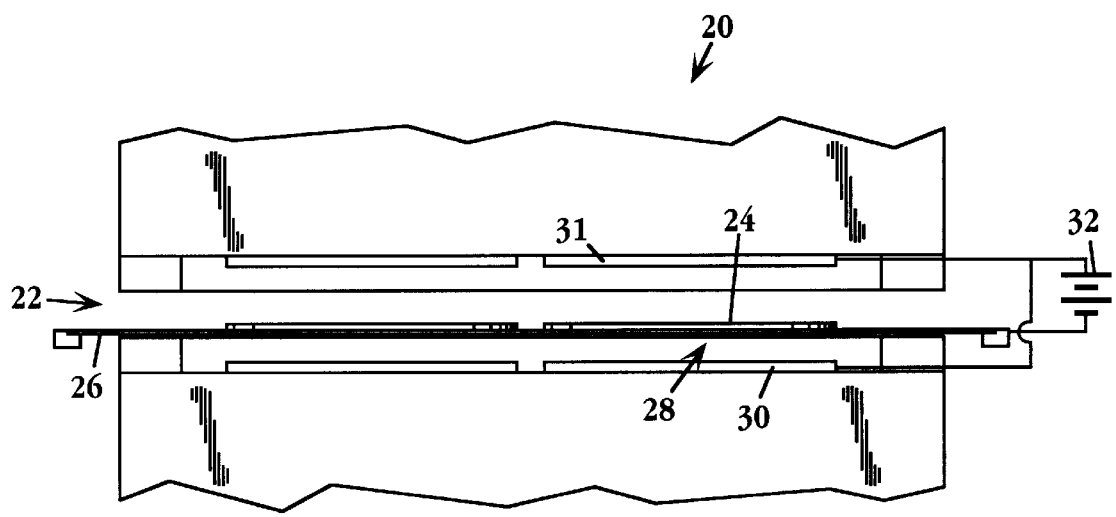
FIG. 2 is a schematic illustration of a portion of a sputtering apparatus used in forming the medium of the invention.

FIG. 2 shows, in schematic view, a portion of a sputtering apparatus 20 which is used for producing the longitudinal magnetic recording medium described in section I. Apparatus 20 includes a vacuum chamber 22 having at least four stations at which sputtering or heating operations occur. A heating station (not shown) at the upstream end of the chamber has a plurality of infrared lights which are arrayed for heating both sides of a substrate, such as substrate 24, carried through the station in the chamber on an aluminum disc holder 26.

Just downstream of the heating station is a first sputtering station 28 at which the crystalline CrTi underlayer is formed on a substrate, in a manner to be described. The station includes a pair of targets, such as targets 30, 31, effective to sputter CrTi onto opposite sides of the substrate or substrates in the chamber. The targets in are formed conventionally from chromium and titanium in the selected ratio.

A second sputtering station (not shown) downstream of chamber 28 is designed for sputtering the magnetic recording layer onto the underlayer. The station includes a pair of sputtering targets for sputtering the magnetic film alloy onto the underlayer-coated substrate. The targets in this station are formed of a Co/Cr-based alloy in one of the exemplary compositions given above. The alloy is formed and shaped for use as a sputtering target by conventional metallurgical methods.

The overcoat in the medium is similarly produced by sputtering from a target in a final sputtering station (not shown) in the apparatus.

Also included in the apparatus is a DC power source 32 for placing a selected voltage potential on substrate 24. More specifically, the power source is designed to place a DC voltage bias on the substrate of −50 to −750 volts with respect to ground in the sputtering chamber where the CrTi underlayer and, optionally, where the magnetic recording layer, are deposited.

The basic sputtering apparatus is preferably a commercial system, such as in available from Intevac (Santa Clara, Calif.), Circuits Processing Apparatus (Fremont, Calif.), ULVAC (Japan), Leybald Heraeus (Germany), VACTEC (Boulder, Colo.), or ANELVA (Japan). These systems are double-sided, in-line, high-throughput machines having two interlocking systems, for loading and unloading. The systems include the capability of placing a bias on the substrate during sputtering. It will be appreciated that DC, RF and DC/RF systems, conventional or magnetron, are suitable.

In operation, the sputtering chamber is evacuated to pressure of about $10^{-7}$ torr, and argon gas is introduced into the chamber to a final sputtering pressure of 5–20 mTorr. A preferred argon gas pressure is 6 mTorr.

The substrate is heated in the heating station to a selected temperature before advancing into the sputtering chamber. The heating conditions in the apparatus are preferably adjusted to achieve a substrate temperature of between about 220° C. and 270° C., and preferably about 250° C.

The heated substrate is moved into the first sputtering chamber, and the CrTi underlayer is deposited onto the disc surface by sputtering under a substrate voltage potential, measured with respect to target, of −50 to −750 volts.

When formation of the underlayer is complete, the applied voltage bias is removed or maintained and the substrate is advanced to the next sputtering chamber for deposition of the cobalt-based magnetic recording layer. Finally, a protective overcoat is deposited on the medium in a sputtering station downstream from the station for deposition of the magnetic layer.

III. Medium Properties

Bulk magnetic properties were determined by vibrating sample magnetometry (VSM) conventionally. Magnetic recording testing was carried out on a Guzik Spin-Stand at 5400 rpm at 0.85" ID, using a dual element head consisting of a thin inductive head for writing and a magnetoresistive head for read-back and including a spectrum analyzer for noise roll-off.

Media in the studies discussed below were prepared using the general techniques described above. More specifically, a randomly polished NiP/Al substrate was heated to 250° C. and an underlayer of the material specified was sputtered deposited to a thickness of 150 Å in the presence (or absence for comparative/control media) of a negative voltage bias (usually −250 V or −500 volts). The negative voltage bias was maintained or readjusted to −250 V and the coated substrate passed to a sputtering station for deposition of the magnetic recording layer of CoCrTaPt (74/17/4/5) to a thickness of about 200 Å, followed by deposition of a less than about 100 Å carbon overcoat. The medium was coated with a standard lubricant.

Figure 3A:
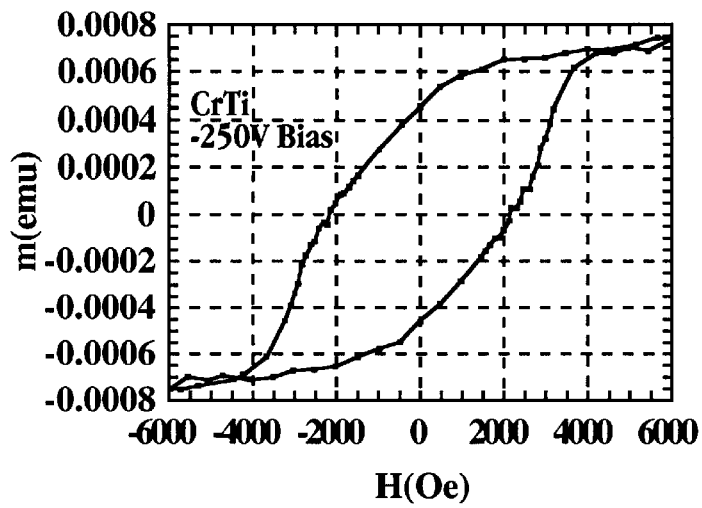
FIGS. 3A–3C are hystersis loops for media prepared in accordance with the invention with negative voltage bias applied during sputter deposition of the CrTi underlayer of −250 V (FIG. 3A) and −500 V (FIG. 3B) and compared to a medium prepared in the absence of a bias (FIG. 3C)
Figure 3B:
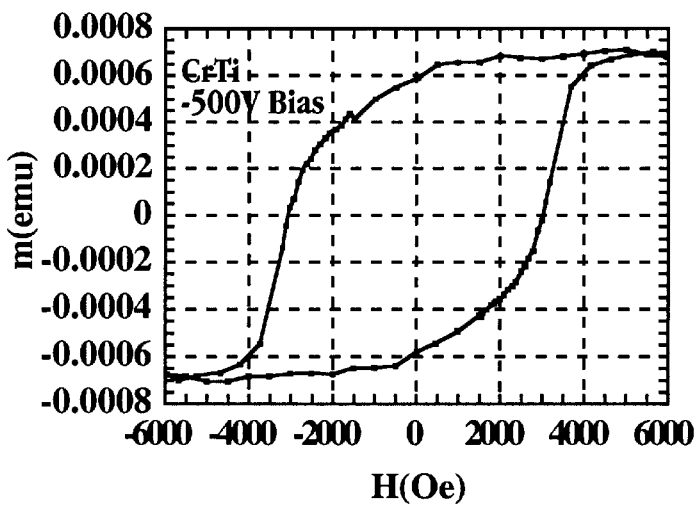
Figure 3C:
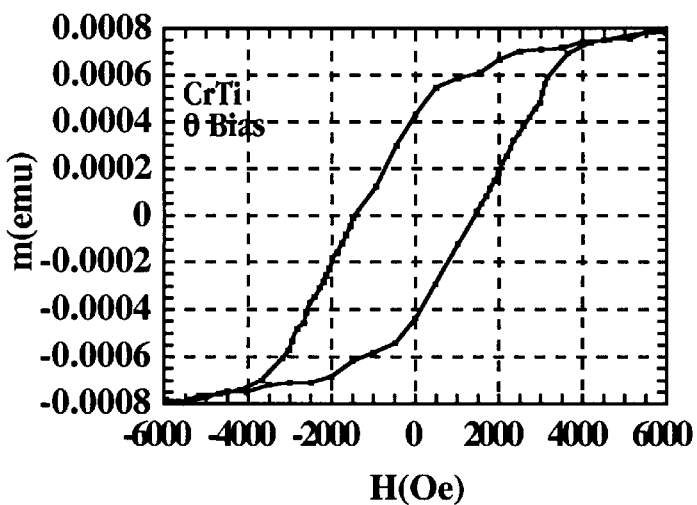

FIGS. 3A–3B are hystersis loops for media prepared in accordance with the invention with negative voltage bias applied during sputter deposition of the CrTi underlayer of −250 V (FIG. 3A) and −500 V (FIG. 3B). FIG. 3C is a hystersis loop for a similar medium to that of FIGS. 3A–3B, but where the CrTi underlayer was deposited in the absence of a substrate bias. The effect of the bias on the shape of the hysteresis loop is apparent.

Figure 4A:
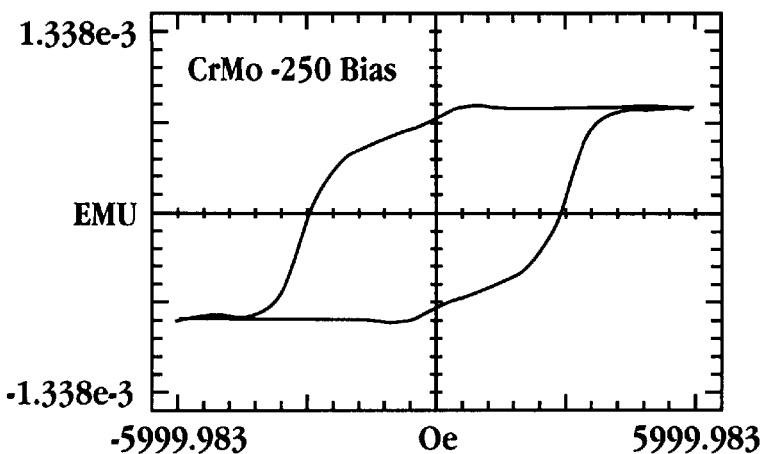
FIGS. 4A–4C are hystersis loops for comparative media prepared with an underlayer of CrMo sputter deposited with a negative voltage bias of −250 V (FIG. 4A) and −500 V (FIG. 4B) and no (0 V) bias (FIG. 4C)
Figure 4B:
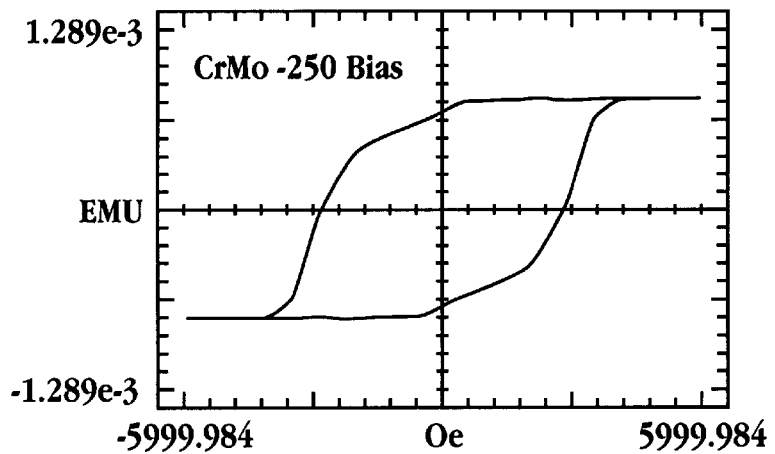
Figure 4C:
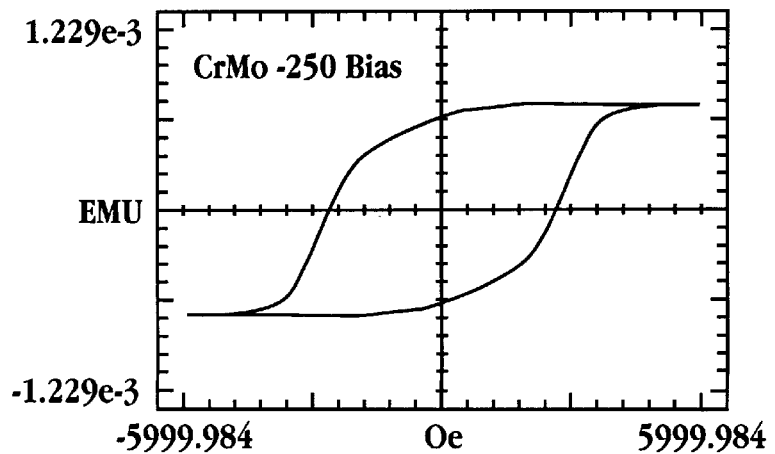

FIGS. 4A–4C are hystersis loops for comparative media prepared identically to the media of FIGS. 3A–3C, except that the underlayer is composed of a CrMo (80/20) alloy sputter deposited with a negative voltage bias of −250 V (FIG. 4A) and −500 V (FIG. 4B) and no (0 V) bias (FIG. 4C). As seen, the shape of the hysteresis loops for each of the CrMo underlayer media is approximately the same, indicating that the presence of a substrate bias during deposition of a CrMo underlayer has no observable effects.

Table 1 summarized the magnetic properties of the media of FIGS. 3A–3C, where the coercivity (Hc), magnetic remanence thickness product ($M_r t$), squareness ratio (SR) and coercivity squareness (S*) are determined from the hysteresis curves conventionally. The CrTi underlayer thickness was 150 Å.

TABLE 1

| CrTi Underlayer Bias (V) | Magnetic Layer Bias (V) | Hc (Oe) | $M_r t$ (memu/cm$^2$) | SR | S* |
|---|---|---|---|---|---|
| 0 | −250 | 1586 | 0.46 | 0.69 | 0.07 |
| −250 | −250 | 2342 | 0.51 | 0.74 | 0.35 |
| −500 | −250 | 3044 | 0.64 | 0.88 | 0.73 |

In other studies performed in support of the invention, media were prepared as set forth above, i.e. with an underlayer deposited in the presence of a substrate bias and a CoCrTaPt magnetic layer, where the underlayer was composed of CrTi, in accordance with the invention, or of comparative materials, CrSi (94/6) and CrMo (80/20).

Figure 5:
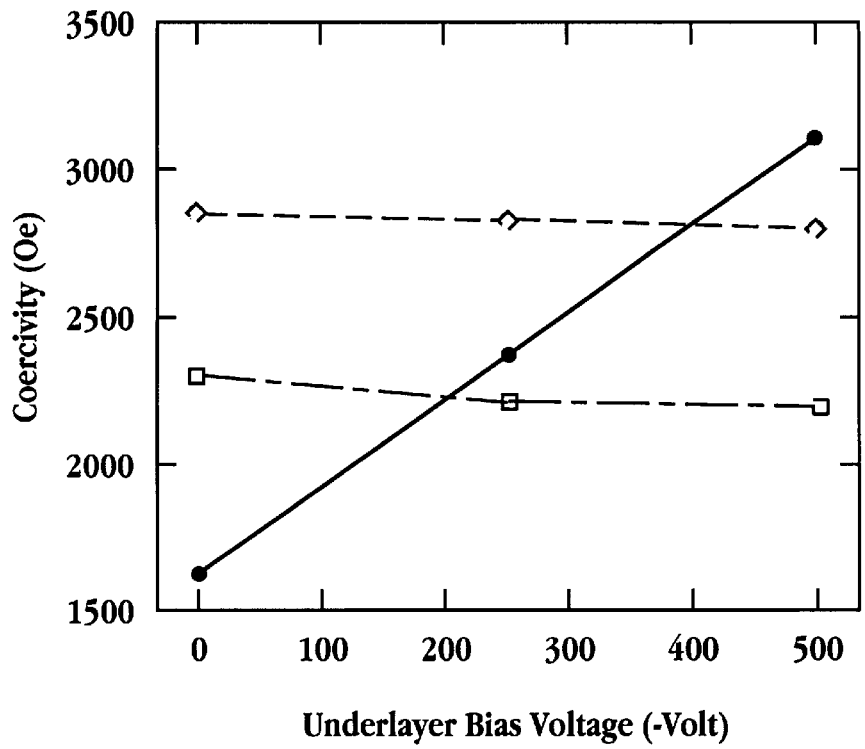
FIG. 5 is a plot showing coercivity, in Oe, as a function of underlayer bias, in −volts, for media prepared with underlayers of CrTi (solid circles), CrSi (open squares) and CrMo (open triangles), where the bias was applied during deposition of the underlayer.
Figure 6:
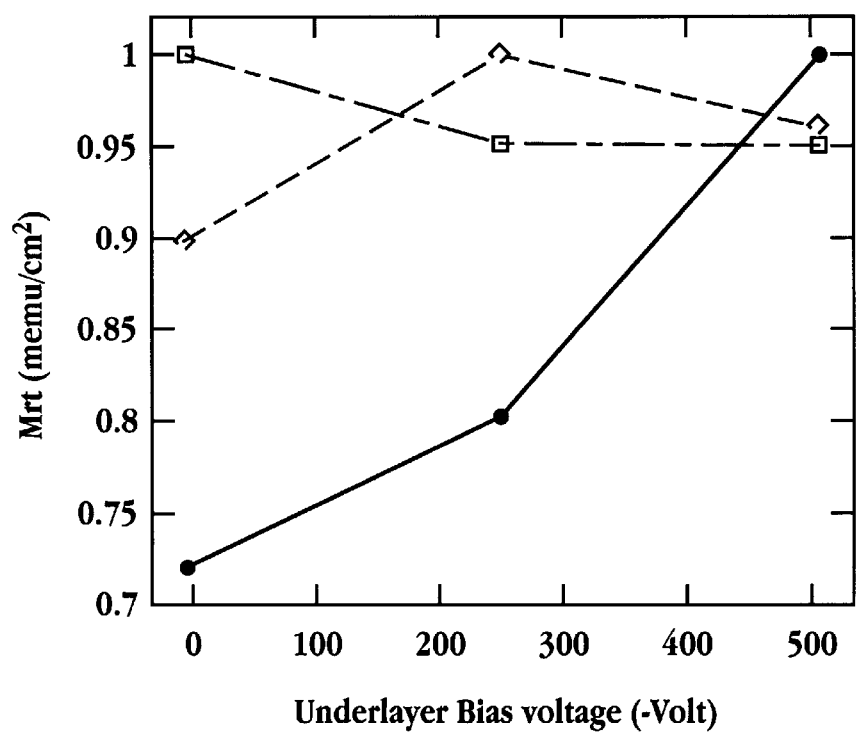
FIG. 6 is a plot showing normalized magnetic remanence thickness product, $M_{rt}$, as a function of underlayer bias, in −volts, for media prepared with underlayers of CrTi (solid circles), CrSi (open squares) and CrMo (open triangles), where the bias was applied during deposition of the underlayer.
Figure 7:
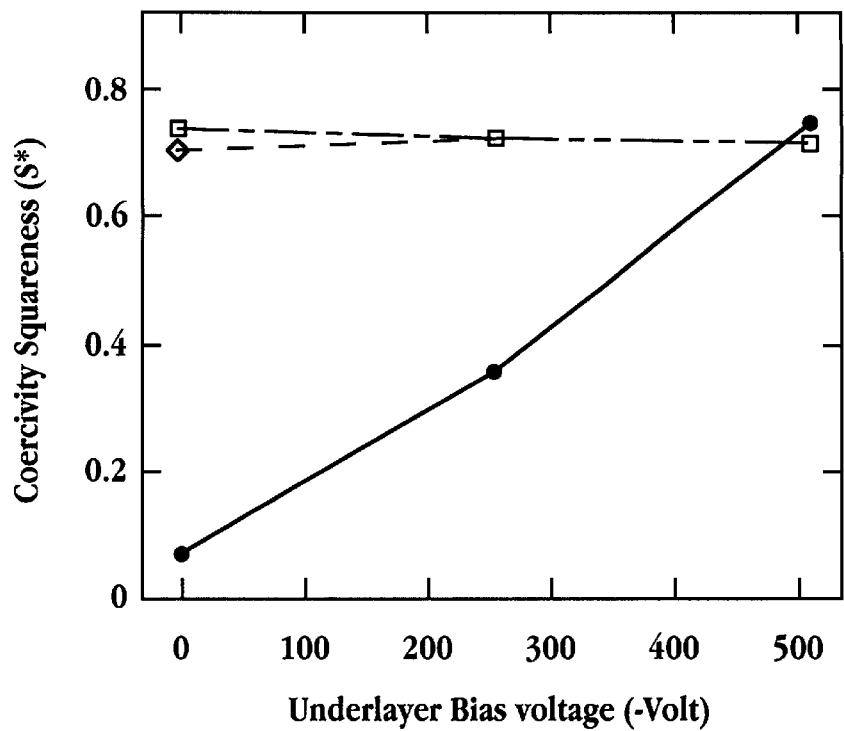
FIG. 7 is a plot showing coercivity squareness, S*, as a function of underlayer bias, in −volts, for media prepared with underlayers of CrTi (solid circles), CrSi (open squares) and CrMo (open triangles), where the bias was applied during deposition of the underlayer.

FIGS. 5–7 shows the recording characteristics of these media, where FIG. 5 shows coercivity, in Oe, as a function of underlayer bias, in −volts. Media having an underlayer of CrTi (solid circles) show a substantial, e.g., nearly 2-fold increase in coercivity for media having an underlayer deposited under a negative voltage bias of 500. As seen, media having an underlayer of CrSi (open squares) or CrMo (open triangles) achieve little, if any, improvement in coercivity when a bias is applied during deposition.

FIG. 6 shows normalized magnetic remanence thickness product, $M_r t$ as a function of underlayer bias, in −volts, for the media described in FIG. 5. As seen, media with an underlayer of CrTi (solid circles) show significant improvement in $M_r t$ when prepared under a substrate bias, whereas, media having an underlayer of CrSi (open squares) and CrMo (open triangles) achieve little, if any, increase in $M_r t$.

FIG. 7 shows coercivity squareness, S*, as a function of underlayer bias, in −volts, for the media of FIGS. 5–6. The coercivity squareness for media having an underlayer of CrTi (solid circles) increases when the underlayer is deposited in the presence of a negative bias. In contrast, media having an underlayer of CrSi (open squares) and CrMo (open triangles), also deposited have no improvement in coercivity squareness.

Table 2 summarizes the recording parametrics for media prepared in accordance with the invention to have a CrTi (80/20) underlayer (150 Å) deposited under a substrate bias. Table 2 shows coercivity (Hc), magnetic remanence thickness ($M_r t$), high frequency (HF) and low frequency (LF) amplitudes, resolution (Res.). overwrite (OW) and pulse width (PW50).

TABLE 2

| CrTi Underlayer Bias (V) | Magnetic Layer Bias (V) | Hc (Oe) | $M_r t$ (memu/cm²) | HF/LF ($\mu$V) |
|---|---|---|---|---|
| 0 | −250 | 1586 | 0.46 | 87/345 |
| −250 | −250 | 2342 | 0.51 | 106/423 |
| −500 | −250 | 3044 | 0.64 | 131/493 |

| CrTi Underlayer Bias (V) | Magnetic Layer Bias (V) | Res. (%) | OW (db) | PW50 (ns) |
|---|---|---|---|---|
| 0 | −250 | 25.2 | 41.2 | 23 8 |
| −250 | −250 | 25.1 | 41.0 | 23.3 |
| −500 | −250 | 26.6 | 39.0 | 22.6 |

Figure 8:
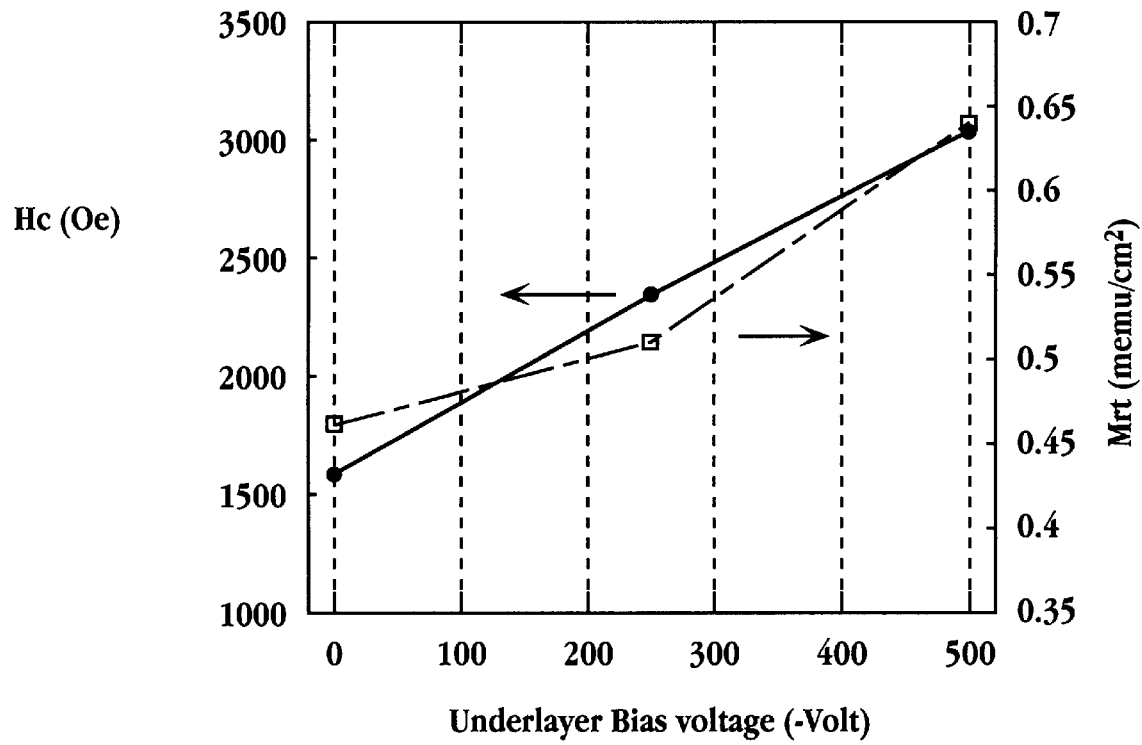
FIG. 8 is a plot showing coercivity, in Oe, (closed circles) and magnetic remanence thickness, $M_r t$, in memu/cm$^2$, (open squares) as a function of underlayer bias, in −volts, for media an underlayer of CrTi.

FIG. 8 is a plot showing coercivity, in Oe, (closed circles) and magnetic remanence thickness, $M_r t$, in memu/cm², (open squares) as a function of underlayer bias, in −volts, for media an underlayer of CrTi (80/20).

Figure 9:
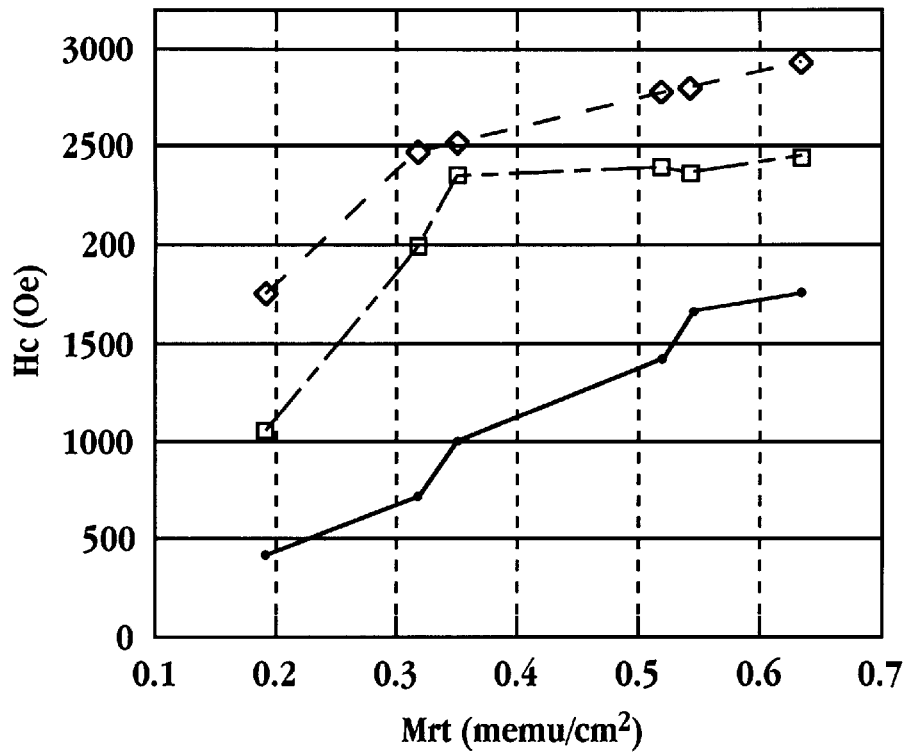
FIG. 9 is a plot showing coercivity, in Oe, as a function of magnetic remanence thickness, $M_r t$, in memu/cm$^2$, for media prepared in accordance with the invention with negative voltage bias applied during sputter deposition of the CrTi underlayer of −250 V (open squares) and −500 V (open diamonds) and no (0 V) bias (closed dots)

FIG. 9 is a plot showing coercivity, in Oe, as a function of magnetic remanence thickness, $M_r t$, in memu/cm², for media having an underlayer of CrTi (80/20). Media prepared in accordance with the invention, that is with a substrate bias, are represented by the open squares and the open diamonds, where the underlayers were deposited with a substrate voltage of −250 V and −500 V, respectively. For comparison, media having a CrTi underlayer deposited in the absence of a substrate bias are shown (closed dots, solid line).

Figure 10:
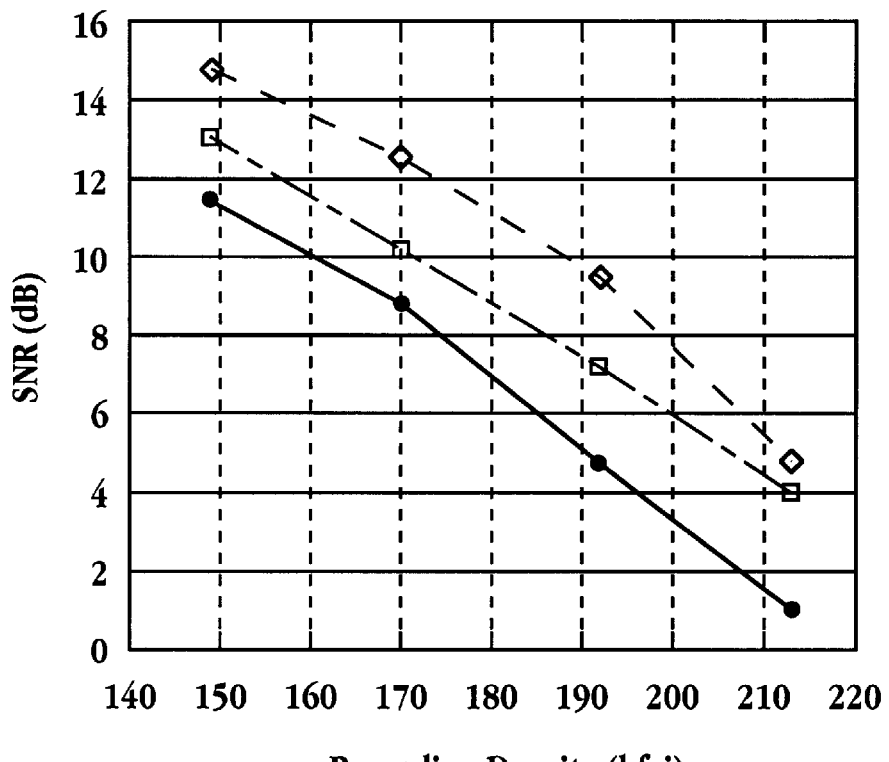
FIG. 10 is a plot showing signal-to-noise ratio, SNR, in dB, as a function of recording density, in kiloflux changes per inch (kfci), for media prepared in accordance with the invention with a negative voltage bias applied during sputter deposition of the CrTi underlayer of −250 V (open squares) and −500 V (open diamonds) and no (0 V) bias (closed dots).

FIG. 10 shows the signal-to-noise ratio, SNR, in dB, as a function of recording density, in kiloflux changes per inch (kfci), for media prepared in accordance with the invention with a negative voltage bias applied during sputter deposition of the CrTi underlayer of −250 V (open squares) and −500 V (open diamonds) and no (0 V) bias (closed dots). As seen the media prepared in accordance with the invention have a higher SNR over the recording density tested, relative to the media prepared with the CrTi underlayer deposited in the absence of a substrate bias.

From the foregoing, it can be appreciated how various features and objects of the invention are met. By sputtering the CrTi underlayer in the presence of a substrate bias of between about −50 volts to −750 volts, significant improvements in magnetic recording properties are achieved. Namely, an improvement of at least 25%, more preferably of about 50%, in coercivity was achieved. A 40% increase in magnetic remanence thickness was also achieved, along with improvements in S*, HF and LF amplitude, PW50 and SNR.

Although the invention has been described with respect to particular embodiments, it will be apparent to those skilled in the art that various changes and modifications can be made without departing from the invention.

It is claimed:

1. A magnetic recording medium for longitudinal recording, comprising an underlayer film composed of 5–50 atomic percent titanium, balance chromium, deposited on a rigid disc substrate by sputtering in the presence of a negative voltage bias, and sputter deposited directly on the underlayer film, a magnetic recording film composed of an alloy including cobalt and chromium.

2. The medium of claim 1, wherein said underlayer film is composed of 15–25 atomic percent titanium, balance chromium.

3. The medium of claim 1, wherein said underlayer is a chromium-titanium alloy composed of 80 atomic percent chromium and 20 atomic percent titanium.

4. The medium of claim 1, wherein the voltage bias is between 50–750 volts.

5. The medium of claim 2, wherein the voltage bias is between 50–500 volts.

6. The medium of claim 3, wherein the voltage bias is between 50–500 volts.

7. A method of preparing a magnetic recording medium for longitudinal recording, comprising depositing under a negative voltage bias an underlayer film composed of 5–50 atomic percent titanium, balance chromium, said underlayer deposited on a rigid disc substrate, and depositing directly on the underlayer film, a magnetic recording film composed of an alloy including cobalt and chromium.

8. The method of claim 7, wherein said underlayer film is composed of 15–25 atomic percent titanium, balance chromium.

9. The method of claim 7, wherein said underlayer is a chromium-titanium alloy composed of 80 atomic percent chromium and 20 atomic percent titanium.

10. The method of claim 7, wherein the voltage bias is between 50–750 volts.

11. The method of claim 9, wherein the voltage bias is between 50–500 volts.

12. The method of claim 10, wherein the voltage bias is between 50–500 volts.

13. In a method of preparing a longitudinal magnetic recording medium having an underlayer composed of an alloy of chromium and titanium and magnetic recording layer composed of a cobalt-chromium alloy, an improvement effective to increase the magnetic remanence thickness product by at least about 10%, said improvement comprising sputter depositing said underlayer under a negative voltage bias.

14. The method of claim 13, wherein said sputter depositing is under a negative voltage bias of between 50–750 volts.

15. The method of claim 13, wherein said sputter depositing is under a negative voltage bias of between 50–500 volts.

* * * * *